(12) United States Patent
Tanaka et al.

(10) Patent No.: US 6,731,040 B1
(45) Date of Patent: May 4, 2004

(54) BRUSH MOTOR FOR ELECTRIC POWER STEERING SYSTEM

(75) Inventors: Toshinori Tanaka, Tokyo (JP);
Masayoshi Yamamoto, Tokyo (JP);
Osamu Waku, Tokyo (JP); Kyouhei Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/609,407

(22) Filed: Jul. 1, 2003

(30) Foreign Application Priority Data

Dec. 27, 2002 (JP) .................... P 2002-379148

(51) Int. Cl.[7] .................. H02K 39/08; H02K 39/06
(52) U.S. Cl. .................. 310/233; 310/235; 310/236; 310/245; 310/248
(58) Field of Search .................. 310/233, 234–237, 310/231, 245, 249, 248, 204, 128, 135, 136; 29/596–598

(56) References Cited

U.S. PATENT DOCUMENTS

| 4,983,873 | A | * | 1/1991 | Tanaka et al. | ............... | 310/248 |
| 5,637,944 | A | * | 6/1997 | Shimoyama | ................ | 310/237 |
| 5,982,072 | A | * | 11/1999 | Sung | ........................... | 310/239 |
| 6,057,626 | A | * | 5/2000 | Tanaka et al. | ............... | 310/233 |
| 6,236,137 | B1 | * | 5/2001 | Tanaka et al. | ............... | 310/233 |

FOREIGN PATENT DOCUMENTS

| JP | 5-236707 A | 9/1993 |
| JP | 2002-153022 A | 5/2002 |

* cited by examiner

*Primary Examiner*—Burton S. Mullins
*Assistant Examiner*—Leda Pham
(74) *Attorney, Agent, or Firm*—Sughrue Mion, PLLC

(57) ABSTRACT

A brush motor for an electric power steering system comprises a four-pole field portion 3, an armature 4 having windings 9 wound around a core 5 with 22 slots 8 to constitute a lap winding, hooks 12 which are formed on one ends of 22 commutator segments 10 respectively and on which the windings 9 are hooked, and a cylindrical commutator 7 constructed by molding integrally the commutator segments 10 with a resin, and four brushes 18 which contact slidably to outer peripheral surfaces of the commutator segments 10, wherein, when the commutator 7 to which a sliding contact portion of the brush 18 contacts is sectioned perpendicularly to an axial direction, a relationship of $0.18 \leq (A \times N)/(D \times D) \leq 0.23$ is satisfied, where A is a sectional area of one commutator segment, N is a number of the commutator segments, and D is a diameter of outer peripheral surfaces of the commutator segments.

14 Claims, 8 Drawing Sheets

BRUSH MOTOR FOR ELECTRIC POWER STEERING SYSTEM

BACKGROUND OF THE INVENTION

The present invention relates to reduction in a brush temperature of a brush motor for an electric power steering system, which has a cylindrical commutator a plurality of commutator segments of which are secured by the resin and a brush that slidably contact to outer peripheral surfaces of the commutator segments of this commutator.

In the brush motor for the electric power steering system in the prior art, in order to reduce temperature rise of the brush, heat generation is suppressed by increasing a reduction rate of the current that is supplied to the motor, and also a heat capacity is improved by increasing a size of the shape of the motor itself, and in addition the heat transferring member that is brought into tight contact with the brush holder to absorb/transfer the heat being generated in the brush is provided to lower the temperature rise of the brush (see Patent literature 1).

Patent Literature 1

The Unexamined Japanese Patent Application Publication No.2002-153022 (Paragraphs [0005], [0007], FIG. 1, FIG. 2)

In the brush motor for the electric power steering system in the prior art, in order to avoid the overheat of the motor, the heat generation is suppressed by increasing the reduction rate of the current, which is supplied to the motor, to limit the supply current. For this reason, the assist torque applied by the motor is reduced in a relatively short time, and thus the steering torque required of the driver is increased. Therefore, in some cases the steering feeling is impaired particularly at the time of low speed driving of the vehicle, and the like. Further, if the heat capacity is improved by increasing a size of the shape of the motor itself, the moment of inertia and the loss of torque are increased in addition to reduction of the mounting easiness and increase of the noise with the increase in size of the motor. Therefore, the steering feeling and the turning-back of the steering wheel are impaired. In addition, if the temperature rise is reduced by bringing the heat transferring member into tight contact with the brush holder, the problems such as the increase of the number of parts, the increase in size and the increase in the noise due to the addition of the heat transferring member, etc. are caused.

In the brush motor for the electric power steering system, when the user steers without running, when the user drives a car into a garage, etc., a current that is larger than that at the steering in the normal running must be supplied. Therefore, the large current is supplied in the situation that the rotation of the motor is stopped or the motor is rotated at the very low speed. Thus, it becomes the important subject to lower the brush temperature in such peculiar used situation. As a result, another solving means that is suitable for the brush motor for the electric power steering system to lower the brush temperature is requested.

SUMMARY OF THE INVENTION

The present invention is made to overcome the above problems, and it is an object of the present invention to get a brush temperature lowering means suitable for a brush motor for an electric power steering system, which is capable of suppressing the temperature rise of the brush portion by thermally transferring heat generated in the brush portion effectively to the armature side, so that the temperature rise of the brush can be suppressed easily without increase in size of the motor if the number of parts is small, the steering feeling can be improved by reducing correspondingly the reduction rate of the current that is supplied to the motor or by increasing the supply current, the noise can be reduced, etc.

A brush motor for an electric power steering system according to the present invention, comprises a four-pole field portion fixed to an inner wall surface of a yoke; an armature having windings which are wound around a core with 22 slots to constitute a lap winding, hooks which are formed on one ends of 22 commutator segments respectively and on which the windings are hooked, and a cylindrical commutator which is constructed by molding integrally the commutator segments with a resin, whereby convex portions for preventing fling-out of the commutator segment are provided on an inner peripheral surface side of each commutator segment to extend over an almost full length in an axial direction; and four brushes which contact slidably to outer peripheral surfaces of the commutator segments; wherein, when the commutator to which a sliding contact portion of the brush contacts is sectioned perpendicularly to an axial direction, a following relationship is satisfied.

$$0.18 \leq (A \times N)/(D \times D) \leq 0.23$$

where A is a sectional area (mm$^2$) of one commutator segment, N is a number of the commutator segments, and D is a diameter (mm) of outer peripheral surfaces of the commutator segments.

Further, a brush motor for an electric power steering system according to the present invention, comprises a four-pole field portion fixed to an inner wall surface of a yoke; an armature having windings which are wound around a core with 22 slots to constitute a lap winding, hooks which are formed on one ends of 22 commutator segments respectively and on which the windings are hooked, and a cylindrical commutator which is constructed by molding integrally the commutator segments with a resin, whereby one leg portion is provided on an inner peripheral surface side of each commutator segment to extend over an almost full length in an axial direction and convex portions for preventing fling-out of the commutator segment are provided to one end of the leg portion; and four brushes which contact slidably to outer peripheral surfaces of the commutator segments; wherein, when the commutator to which a sliding contact portion of the brush contacts is sectioned perpendicularly to an axial direction, a following relationship is satisfied.

$$0.10 \leq T/D \leq 0.14$$

where T is a thickness (mm) of the commutator segment in a radial direction, and D is a diameter (mm) of outer peripheral surfaces of the commutator segments.

DETAILED DESCRIPTION OF THE PREFERRED EMBODIMENTS

Embodiment 1

Figure 1:
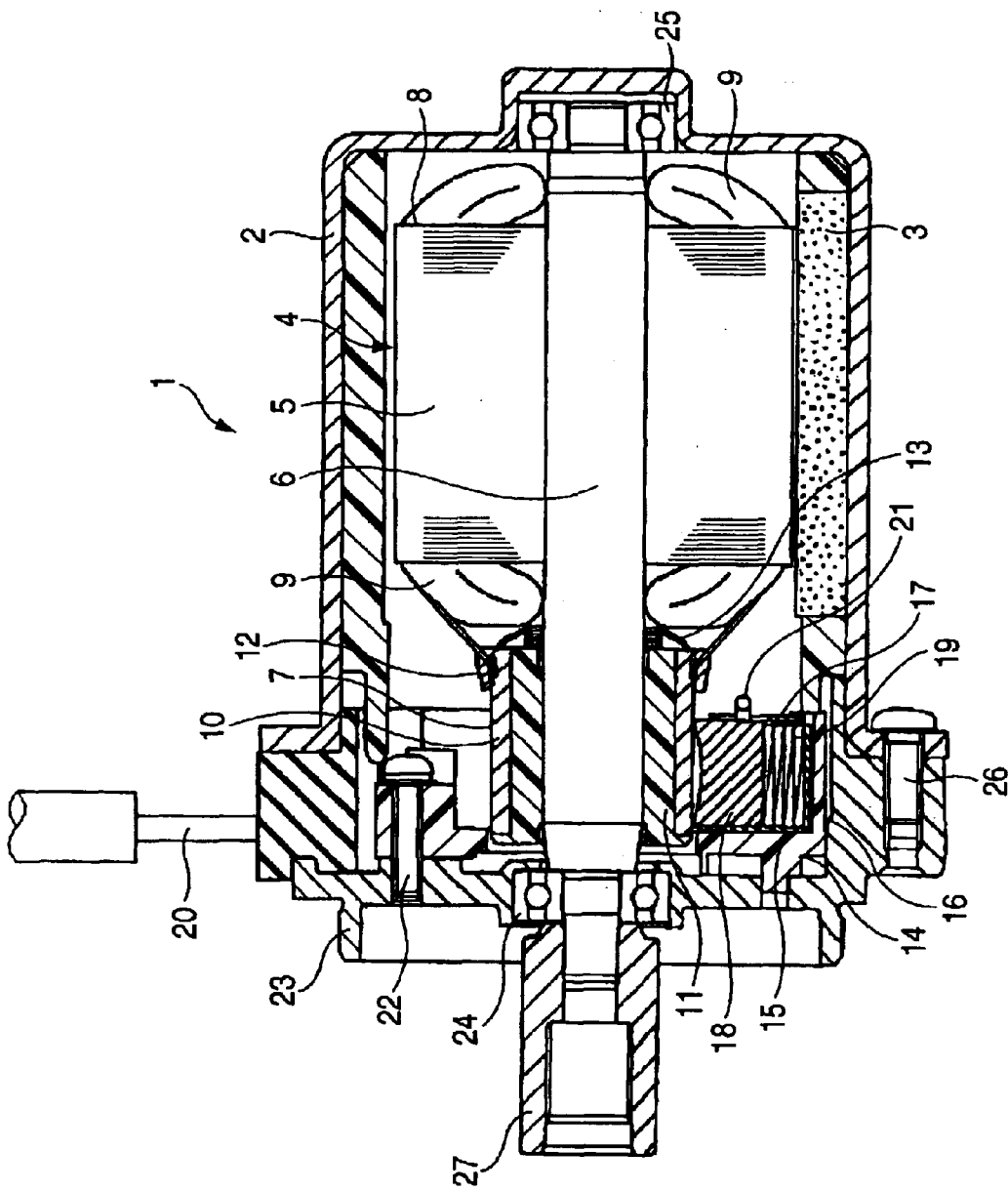
FIG. 1 is a sectional view of a brush motor for an electric power steering system showing an embodiment 1 of the present invention.
Figure 2:
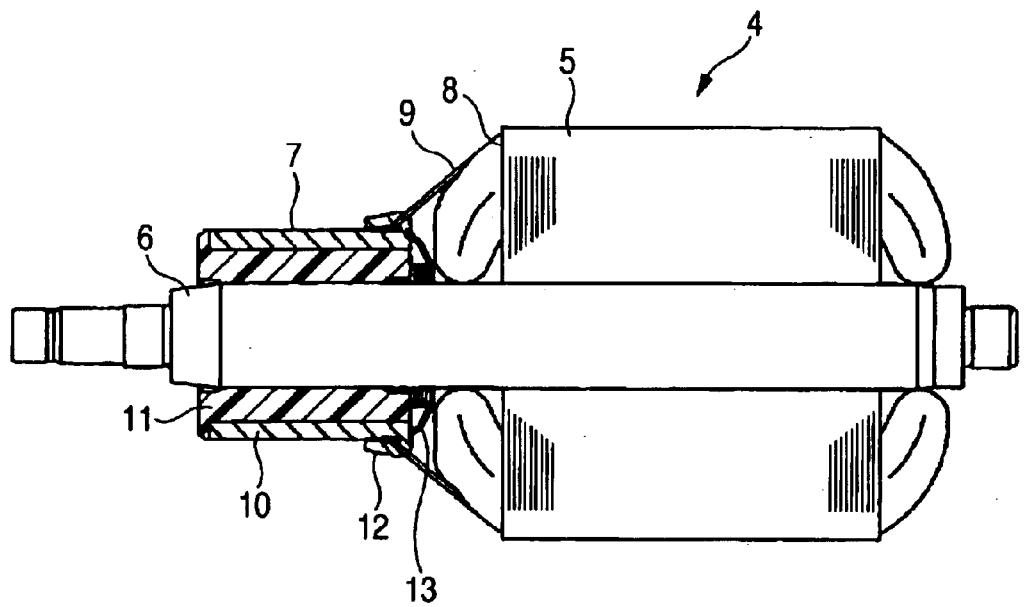
FIG. 2 is a pertinent sectional view of an armature showing the embodiment 1 of the present invention.

FIG. 1 is a sectional view of a brush motor for an electric power steering system in an embodiment 1 of the present invention. FIG. 2 is a pertinent sectional view of an armature of the system. An explanation will be made hereinafter by affixing same symbols to same or equivalent parts in Figures. In Figures, in a brush motor 1 for an electric power steering system, a magnet 3 acting as a four-pole field portion is secured to an inner wall surface of a yoke 2, and a core 5 of an armature 4 opposes to the inner diameter side of the magnet 3 via a predetermined clearance. The armature 4 has the core 5 fixed to a rotation shaft 6 and a commutator 7. The core 5 that is constructed by laminating the flat rolled magnetic steel sheets and strip has 22 slots 8. A winding 9 that is constructed by winding the enameled copper wire, a wire diameter of which is about 0.7 mm, or the like as a lap winding is provided into the slot 8.

The commutator 7 has 22 commutator segments 10, and is molded integrally with a resin 11 such as phenol, or the like to fix and insulate the commutator segments 10, and is fixed to the rotation shaft 6 by the press fitting, or the like. A hook 12 and the commutator segments 10 are formed integrally on one end side of an outer peripheral surface of the commutator segments 10 that is made of copper material. The winding 9 and an equalizer 13 are latched on the hook 12 and are connected to the commutator segments 10 by the fusing, or the like.

A brush holder 14 is constructed by fitting a plate 16 made of the brass plate, or the like and a holder 17 to a base 15 molded with resin such as PPS, or the like, and then arranging brushes 18 and springs 19, which push the brushes 18 against an outer peripheral surface of the commutator segments 10, onto a box portion that includes the plate 16 and the holder 17. Four brushes 18 are arranged in the brush holder 14 at an angle interval of 90 degrees. A lead wire 20 connected to a control unit (not shown) is introduced into the brush holder 14 and is connected electrically to a pigtail 21 that is extended from the brush 18. Further, the brush holder 14 is secured to a housing 23 by fitting screws 22.

The armature 4 is supported rotatably by bearings 24 and 25. The yoke 2 is fixed to the housing 23 by fitting screws 26. A coupling 27 is secured to one end of the rotation shaft 6 by the press fitting, or the like, and is coupled with the worm shaft (not shown), or the like to transmit a rotating force of the armature 4. In this case, a rated current of the brush motor 1 for the electric power steering system is 80 A, and this brush motor is installed into the vehicle whose engine capacity is about 2000 cc.

Figure 3:
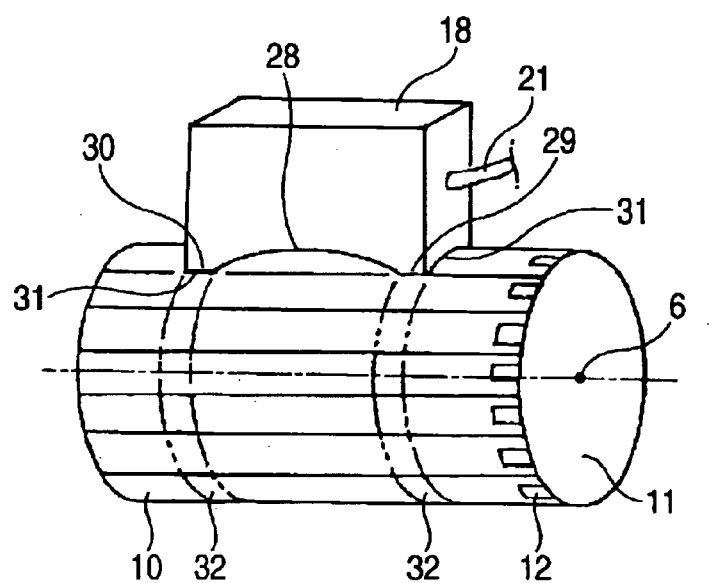
FIG. 3 is an explanatory view of a shape of a brush showing the embodiment 1 of the present invention.

FIG. 3 is an explanatory view showing a shape of a brush. The brush 18 has a concave portion 28 whose inner portion in the axial direction does not contact slidably to the commutator segments 10, and both end portion of the brush in the axial direction are shaped to contact slidably to the commutator segments 10. Both sliding surfaces 31 of an end portion 29, which is located on the hook side in the axial direction, and an end portion 30, which is located on the opposite side to the hook, of the brush 18 have the same curvature of the diameter as the outer peripheral surfaces of the commutator segments 10. The sliding surfaces 31 contact sildably to the outer peripheral surfaces of the commutator segments 10 to form two sliding traces 32. In this case, a dimension of the brush 18 in the axial direction is about 15 mm, and the brush 18 has the sliding surface 31 of about 2 mm at both ends in the axial direction.

Figure 4:
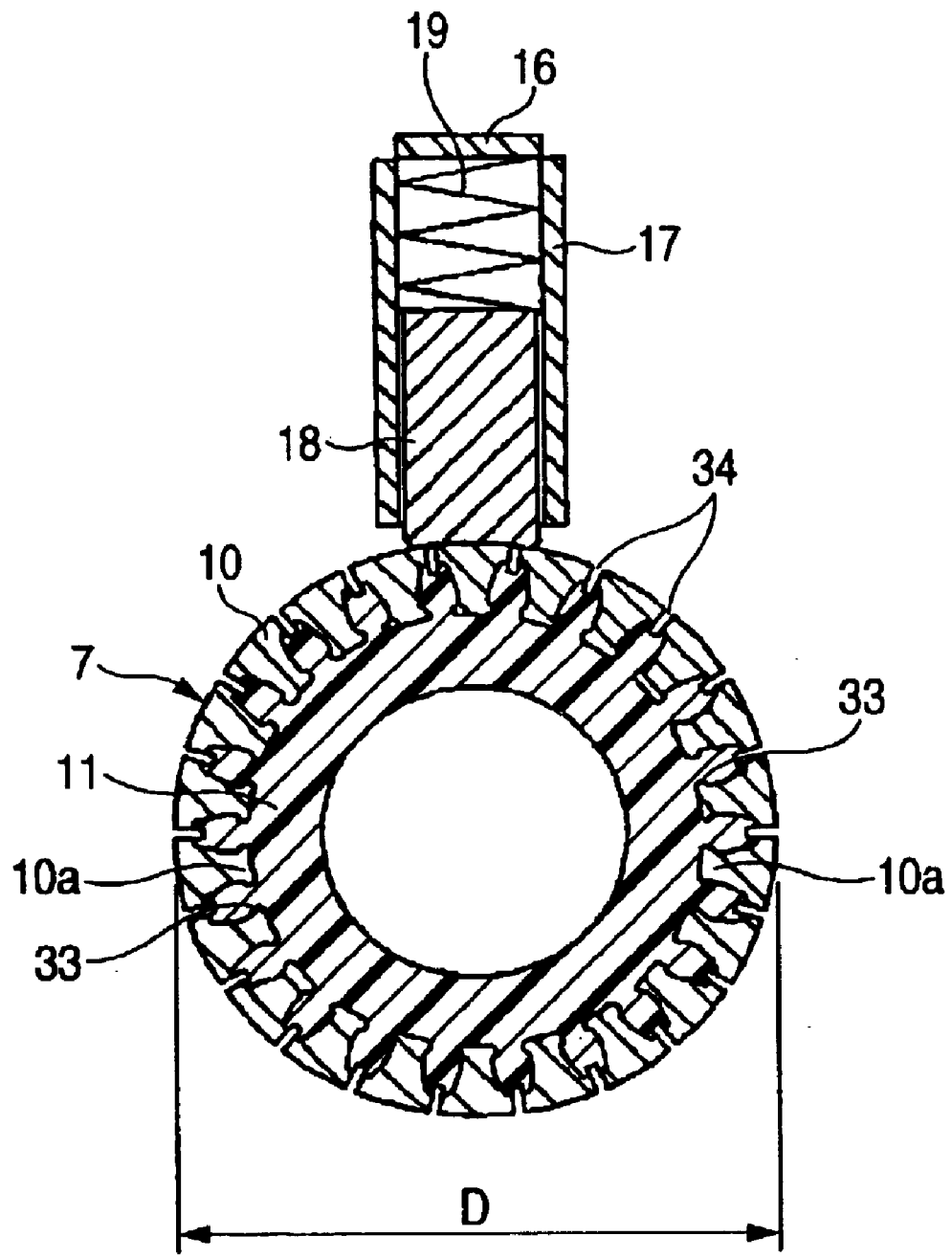
FIG. 4 is a pertinent sectional view of a sliding contact portion, which is taken along perpendicularly to an axial direction, showing the embodiment 1 of the present invention.

FIG. 4 is a pertinent sectional view of the sliding contact portion of the brush in FIG. 3, which is taken along perpendicularly to the axial direction. The brush 18 is shaped to have a width that spread over three adjacent commutator segments 10 to contact sildably to them. Each commutator segment 10 having an almost drum shape has one leg portion 10a that extends toward the inner peripheral surface side. One end of the leg portion 10a has convex portions 33 each having a pigeon tail shape to prevent the fling-out of the commutator segment 10. The leg portion 10a extends over an almost full length in the axial direction. The convex portions 33 prevent a motion of the commutator segment 10 caused by a centrifugal force, or the like. The commutator segment 10 is constructed in such a manner that 22 annulus segments that are connected together are formed from the copper pipe material by the press working, then these segments are molded integrally with the resin 11, and then adjacent segments are separated electrically into the commutator segment by undercuts 34 respectively. In this case, a dimension of an inner diameter of the commutator segment 10 is reduced, and a thickness of the commutator segment 10 in the radial direction is about 1.4 times the conventional commutator segment.

The number N of the commutator segments 10 of the commutator 7 is 22, and the diameter D of the outer peripheral surface of the commutator segments 10 is 28 mm. Further, a sectional area A of one commutator segment 10 is 7.5 mm². Hence, (A×N)/(D×D)=0.21. In this case, (A×N)/(D×D) is called a sectional area factor in the following.

Figure 5:
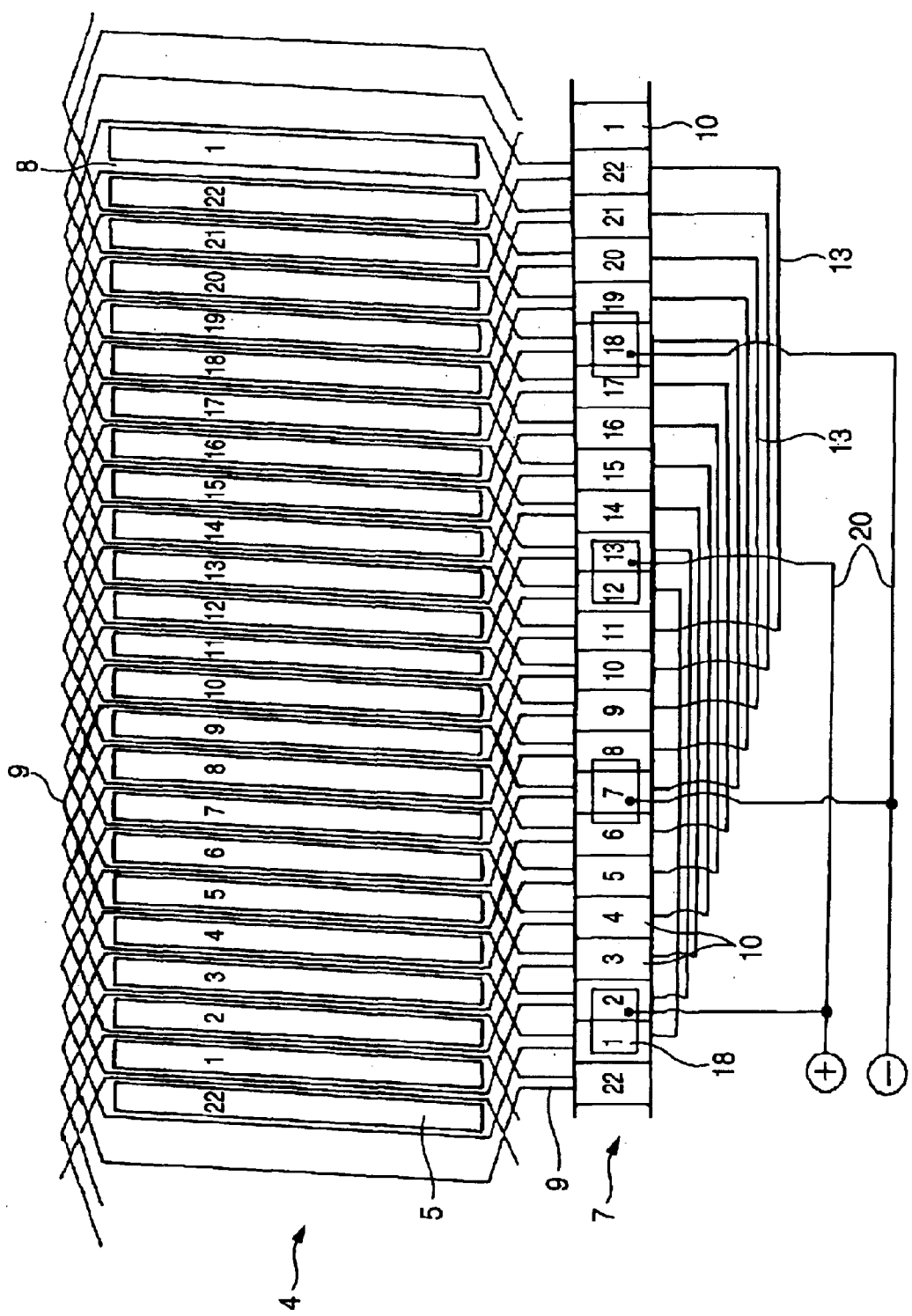
FIG. 5 is an electric connection diagram of the brush motor for the electric power steering system showing the embodiment 1 of the present invention.
Figure 6A:
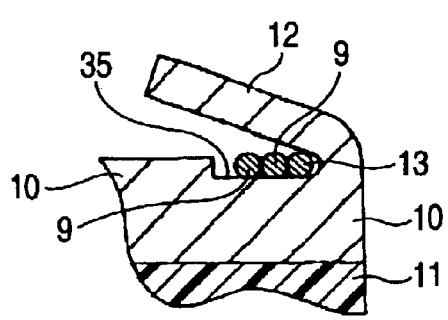
FIGS. 6A and 6B are pertinent sectional views of a commutator showing the embodiment 1 of the present invention.
Figure 6B:
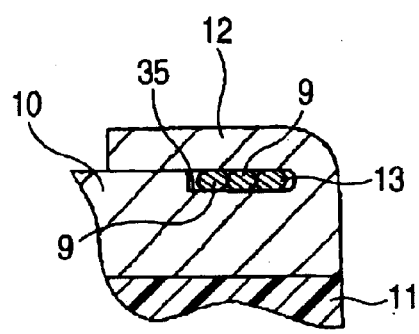

FIG. 5 is an electric connection diagram of the brush motor 1 for the electric power steering system. FIG. 6 is a pertinent sectional view of the commutator 7 taken along in the axial direction, wherein FIG. 6A is an explanatory view showing the state that the equalizer 13 and the winding 9 are arranged in the hook 12 in the course of the manufacture of the armature 4, and FIG. 6B is a pertinent sectional view showing the state that the equalizer 13 and the winding 9 are connected to the commutator segments 10. In Figures, the core 5 of the armature 4 has 22 slots 8, and the windings 9 that are wound plural times at a predetermined slot pitch to constitute one coil are inserted in the slot 8. Thus, the so-called lap winding in which the winding 9 is inserted into the slot 8 to shift sequentially by one slot pitch is constructed. As the equalizer 13, 11 opposing commutator segments 10 out of 22 commutator segments 10 are connected via 11 enameled copper wires, or the like.

First, one end of the equalizer 13 is hooked on the hook 12, and then the equalizer 13 is cut to hook the other end on the hook 12 arranged on the opposite side. Thus, 11 equalizers 13 are provided by repeating the above step. Then, one end of the winding 9 is hook on the hook 12, then the winding 9 is wound plural times around predetermined slots, then the winding 9 is hook on the next hook 12, and then the winding 9 is wound plural times continuously around predetermined slots without the disconnection to return to the next but one hook 12. The winding 9 is constructed into the so-called double winding, into which 44 coils are inserted, by repeating the above step. Therefore, two windings 9 (four windings 9 at a start of winding and an end of winding) are hooked on one hook 12. In other words, four windings 9 are extended between a certain hook 12 and the core 5. The double winding is constructed by inserting the coil, a sectional area of which is half of a predetermined sectional area of the winding 9, by twice coil number (44 which is twice the normal number of 22), but the armature resistance is set electrically equal to the ordinary armature resistance.

With the above, in FIG. 6, one equalizer 13 and two windings 9 are arranged (four windings 9 are arranged between the hook 12 and the core 5) in a recess portion 35 constructed in the commutator segment 10. Insulating coatings of the windings 9 and the equalizer 13 are peeled off by the fusing, or the like, and the windings 9 are connected to the commutator segments 10 without fail.

Figure 7:
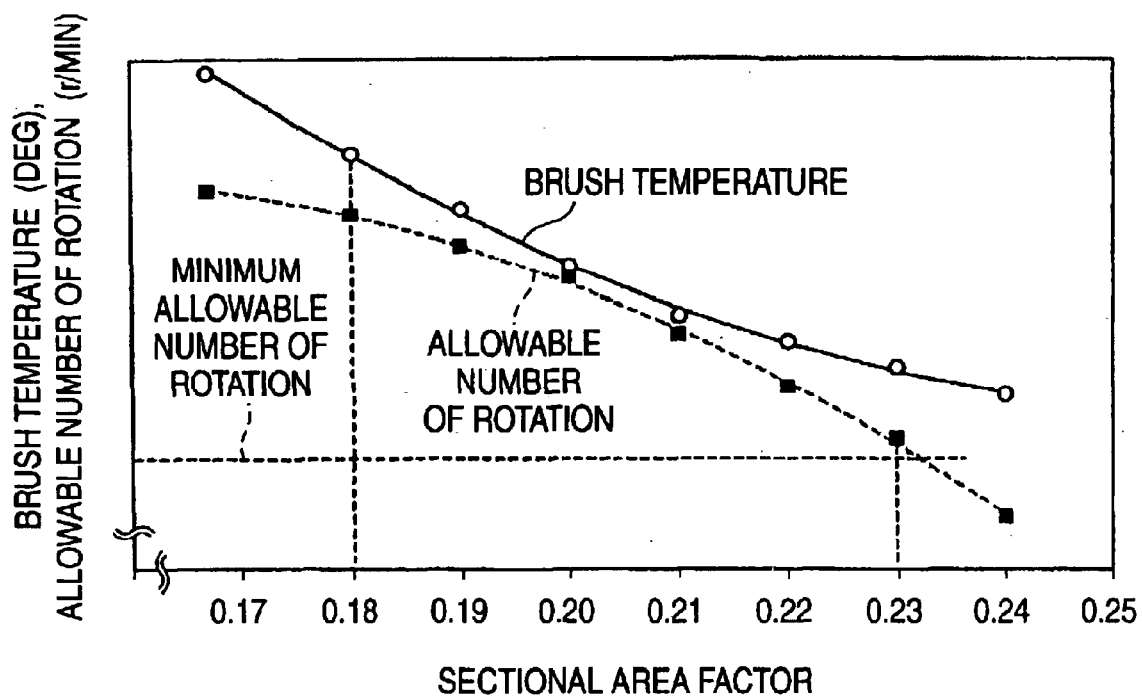
FIG. 7 is an explanatory view showing measured results of a sectional area factor, a brush temperature, and an allowable number of rotation showing the embodiment 1 of the present invention.

FIG. 7 is an explanatory view showing measured results of a sectional area factor, a brush temperature, and an allowable number of rotation. As the brush temperature, a temperature rise of the brush 18 was measured by the thermocouple, which is fitted to the brush 18, while supplying a predetermined current to the armature 4 in the situation that rotation of the armature 4 is inhibited. As described above, in the brush motor 1 for the electric power steering system, since in some cases the large current is supplied during when the armature 4 is not rotated, the temperature is measured under the severe condition of the brush temperature. As the allowable number of rotation, a number of rotation at which the commutator segments 10 are destroyed by the centrifugal force was measured by driving/rotating the armature 4 by the external force while setting the armature 4 to a predetermined high temperature. In the brush motor 1 for the electric power steering system, the allowable number of rotation is decided with regard to a safety factor on the assumption that the armature 4 is rotated excessively from the wheel side via a reducing mechanism. The minimum allowable number of rotation is a minimum allowable number of rotation that is needed as the brush motor 1 for the electric power steering system. As shown in FIG. 7, if the sectional area factor is increased, the brush temperature is reduced and also the allowable number of rotation is lowered.

The sectional area factor is set below 0.17 such as 0.166, 0.168, or the like in the similar motor in the prior art. If the sectional area factor is set to 0.18 or more but 0.23 or less, the brush temperature can be reduced while assuring the number of rotation in excess of the minimum allowable number of rotation. More preferably, if the sectional area factor is set to 0.21 or more, such effect can be increased. The increase of the sectional area factor results in not only the reduction in rotational strength of the commutator segments 10 but also the increase in cost due to increase of an employed amount of the copper material and the reduction in workability of the commutator segments 10. Therefore, such increase of the sectional area factor was not considered unnecessarily in the prior art. As a result, such a technical concept was not found that the heat generated in the brush portion of the brush motor 1 for the electric power steering system is thermally transferred to the armature side by increasing the sectional area factor to lower the brush temperature.

In the brush motor 1 for the electric power steering system constructed in this manner, the armature 4 generates a rotating force when a predetermined current is supplied to the brush motor 1 for the electric power steering system from a control unit (not shown) via the lead wire 20, and the rotating force is transmitted to a worm shaft (not shown) that is coupled with the coupling 27 being secured to the rotation shaft 6. Thus, the steering force that is required of the driver can be reduced.

As described above, a sectional area of the commutator segment 10 is increased by setting the sectional area factor to 0.21. Therefore, even when not only the heat capacity is increased simply but also the great heat is generated in a short time, e.g., at the time of putting a car into the garage, the heat generated in the brush 18 can be thermally transferred effectively from the commutator segment 10 to the winding 9 and the equalizer 13 and also heat generation of the commutator segment 10 itself can be reduced, so that the temperature rise of the brush 18 can be suppressed. As a result, a reduction rate of the supplied current and a rated current can be increased, so that the steering feeling can be improved. Further, the minimum allowable number of rotation is satisfied and thus the safety brush motor 1 for the electric power steering system can be obtained. Further, because the sectional area is increased by reducing the inner diameter dimension of the commutator segment 10, the change in the basic configuration of the motor is not needed and thus the brush motor 1 for the electric power steering system that is small in size and has a small loss torque can be obtained.

Since the four-pole magnet 3, 22 slots 8, and four brushes 18 are provided, such four brushes 18 share the heat generation and the heat conduction. Further, since the states of the opposing brushes 18 are equal to each other, the brush temperature is stabilized and thus the temperature rise can be suppressed effectively. In addition, the noise and the torque ripple can be reduced since the four poles and 22 slots 8 are employed, and also the brush temperature and the noise can be reduced by providing the equalizers 13. Thus, the brush motor 1 for the electric power steering system that is not obtained in the prior art can be obtained.

Further, the hooks 12 to which the winding 9 and the equalizer 13 are connected are provided together with the commutator segments 10 to one ends of the outer peripheral surfaces of the commutator segments 10 to have the almost same diameter as the outer peripheral surface. Therefore, since distances from the brush 18 to the winding 9 and the equalizer 13 are shortened rather than the so-called riser-type commutator 7 that has a collar portion, which extends in the outer diameter direction, on one ends of the outer peripheral surfaces of the commutator segments 10, the heat conduction can be improved and also the temperature rise can be suppressed effectively. In addition, since the centrifugal-force resistance can be improved rather than the riser-type commutator, the sectional areas of the commutator segments 10 can be increased and the temperature rise can be suppressed much more.

Further, one leg portion 10a is provided to each commutator segment 10 and thus the increase of the sectional area is easy and the workability is good. Since the leg portion 10a extends over the overall area except the sagging formed on both end portions in the axial direction, etc., the heat conduction is improved and the brush temperature can be lowered effectively. Further, since the convex portion 33 extends over the almost overall area except the sagging formed on both end portions in the axial direction, etc., the commutator segment 10 is bonded firmly to the resin 11 and the commutator segment 10 is difficult to move. Thus, the safety brush motor 1 for the electric power steering system with the low noise can be obtained. In this case, because the sectional area of the commutator segment 10 made of the copper material is increased, the heat conduction is higher than the resin 11 by which the commutator segments 10 are fixed, and the temperature rise can be suppressed effectively.

In addition, no notch is formed in contrast to other commutator 7 of the type that has the notch, etc. in the middle of the axial direction of the commutator segment 10 on the inner peripheral surface side along the outer diameter direction. Therefore, the heat conduction to the windings 9 is good, and the temperature rise can be suppressed effectively, and also the commutator 7 can be manufactured inexpensively. Further, since the commutator 7 is molded integrally with the resin 11 in the situation that the commutator segment 10 are coupled with each other and respective commutators 7 are separated electrically after the molding, the manufacture of the commutator 7 becomes easy and inexpensive. Since the commutators 7 are separated after the molding, the margin in the shape of the connecting portion between the commutator segments 10 is large and the workability is good. Further, since the commutators 7 are separated after the molding, the sectional area of the commutator segment 10 can be increased easily.

The windings 9 of the armature 4 are wound as the double winding, and also two windings 9 are connected to the hook 12. Therefore, contact areas between the commutator segments 10 and the windings 9 are increased and the number is large, and thus the heat conduction to the windings 9 can be improved effectively. Further, the windings 9 are wound at a high density because of the double winding, and contact areas between the windings 9 on the edge surface of the core 5 and the windings 9 in the slot 8 are increased, and the heat conduction can be improved.

Further, the equalizer 13 is connected to the hook 12, the heat conduction from the commutator segments 10 to the equalizer 13 can be attained. Thus, not only the temperature rise of the brush 18 can be reduced more effectively, but also the brush temperature can be lowered because of improvement of the commutation and the noise can also be reduced.

Further, since the temperature rise of the brush 18 can be reduced effectively, the melting of the resin and the change of the dimension can be suppressed even if the brush holder 14 having the base 15 whose area in the neighborhood of the brush 18 is molded with resin is employed. Thus, the low-noise and inexpensive brush motor 1 for the electric power steering system in which the sliding of the brush 18 is good can be obtained. Further, since the reduction rate of the current is reduced, etc., the steering feeling can be improved.

Since a part of the brush 18 in the axial direction is shaped to contact slidably to the commutator segments 10, a surface pressure of the sliding surface 31 is increased and contact of the brush 18 is stabilized. Further, the heat generation can be reduced and the noise can be reduced. In particular, such brush is suited for the brush motor 1 for the electric power steering system in which a load applied to the springs 19 is small to reduce the loss torque.

Further, the brush 18 is shaped to have a width that contacts slidably to more than three commutator segments 10 that are positioned adjacently in the circumference direction. Therefore, the heat conduction from the commutator segments 10 to the windings 9 and the equalizer 13 can be improved further rather than the case that the brush 18 contacts slidably to two commutator segments, and the temperature rise of the brush 18 can be reduced effectively.

Further, since the diameter D of the outer peripheral surface of the commutator segments 10 is set to 28 mm, the sectional area factor can be increased while keeping the rotational strength of the commutator segments 10, and the brush temperature can be reduced. If the diameter D of the outer peripheral surface of the commutator segments 10 is set excessively small, the loss torque can be reduced but the sectional area factor cannot be increased while keeping the rotational strength of the commutator segments 10. In contrast, if the diameter D of the outer peripheral surface of the commutator segments 10 is set excessively large, the loss torque is increased. As a result, preferably the diameter D of the outer peripheral surface of the commutator segments 10 should be set to 20 mm to 50 mm. More preferably, such diameter D of the outer peripheral surface should be set to 23 mm to 33 mm. Further, if a product of the rated current and the current supply time is kept constant, the similar effect can be achieved when the rated current is set in a range of 25 A to 80 A, and also the temperature rise can be reduced effectively.

Embodiment 2

Figure 8:
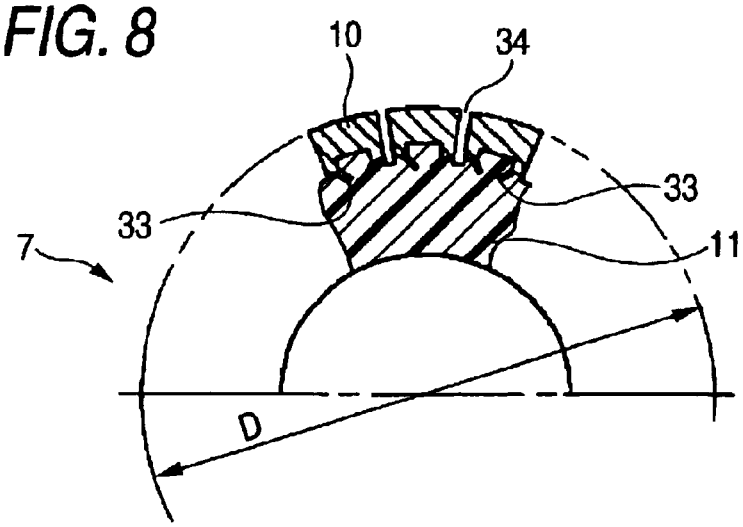
FIG. 8 is a pertinent sectional view of a sliding contact portion, which is taken along perpendicularly to an axial direction, showing an embodiment 2 of the present invention.

FIG. 8 shows another embodiment of the convex portion 33 that prevents the fling-out of the commutator segment 10. Remaining portions are similar to the embodiment 1. FIG. 8 is a pertinent sectional view of the sliding contact portion of the brush, which is taken along perpendicularly to the axial direction, like FIG. 4. Two convex portions 33 that are bent toward the center side of each commutator segment 10 in the circumstance direction to prevent the fling-out of the commutator segment 10 are provided to the inner peripheral surface side of the commutator segments 10 over the almost all area in the axial direction. The convex portions 33 prevent the motion of the commutator segment 10 by the centrifugal force, etc. The commutator segment 10 is constructed in such a manner that the copper plate material having a plate thickness of 2.4 mm is rounded into the annular shape, then the convex portions 33 are formed, then the segments are molded integrally with the resin 11 in the state that 22 commutator segments 10 are connected together, and then adjacent commutator segments are separated electrically by the undercuts 34 respectively after the molding. The number N of the commutator segments 10 of the commutator 7 is 22, and the diameter D of the outer peripheral surface of the commutator segments 10 is 28 mm. Further, one sectional area A of one commutator segment 10 is 6.5mm$^2$. Hence, the sectional area factor is set to 0.18.

The sectional area of the commutator segment 10 is increased toward the inner diameter side by setting the sectional area factor to 0.18. Therefore, the effect of reducing the brush temperature is slightly reduced rather than the embodiment 1, nevertheless the considerable effect can be achieved. In particular, since the commutator segment 10 is formed by rounding the plate material, such commutator segment 10 can be formed inexpensively rather than the case that the commutator segment is formed by the pipe material. Since the sectional shape of the commutator segment 10 shown in FIG. 8 extends substantially in the axial direction, not only the sectional area can be increased easily but also the commutator segments 10 can be secured firmly by the resin 11. Therefore, even if the commutator 7 is formed by rounding the plate material, such brush can be used in the brush motor 1 for the electric power steering system in which the low noise is requested. Since respective commutator segments are separated electrically after the molding, the manufacture of the commutator 7 is made easy and inexpensively. Since the commutator segments are separated after the molding, the margin in shapes of the commutator segments 10 and their conneting portions can be enhanced, and the workability of the commutator segments 10 can be improved and also the sectional area of the commutator segment 10 can be increased easily.

Embodiment 3

Figure 9:
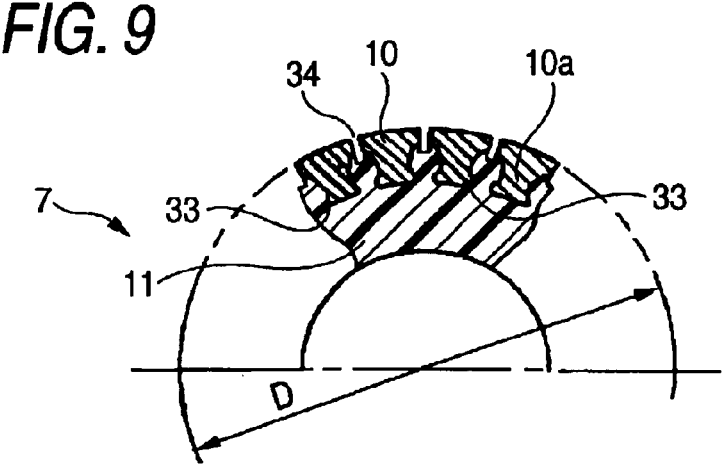
FIG. 9 is a pertinent sectional view of a sliding contact portion, which is taken along perpendicularly to an axial direction, showing an embodiment 3 of the present invention.

FIG. 9 is a pertinent sectional view of the sliding contact portion of the brush, which is taken along perpendicularly to an axial direction, like FIG. 4. The sliding contact portion of the brush has the similar configuration to FIG. 4. The number N of the commutator segments 10 of the commutator 7 is 22, and the diameter D of the outer peripheral surface of the commutator segments 10 is 24.5 mm. Further, one sectional area A of one commutator segment 10 is 5.74 mm². Hence, the sectional area factor is se to 0.21. Further, the rated current is 40 A, and this brush motor is installed into the vehicle whose engine capacity is about 1000 cc.

The sectional area of the commutator segment 10 is increased toward the inner diameter side by setting the sectional area factor to 0.21. Therefore, the similar effect to the embodiment 1 can be achieved. Since the diameter D of the outer peripheral surface of the commutator segments 10 is reduced smaller than the embodiment 1, the loss torque can be reduced and thus this brush motor can also be installed into the vehicle whose engine capacity is relatively small.

Embodiment 4

Figure 10:
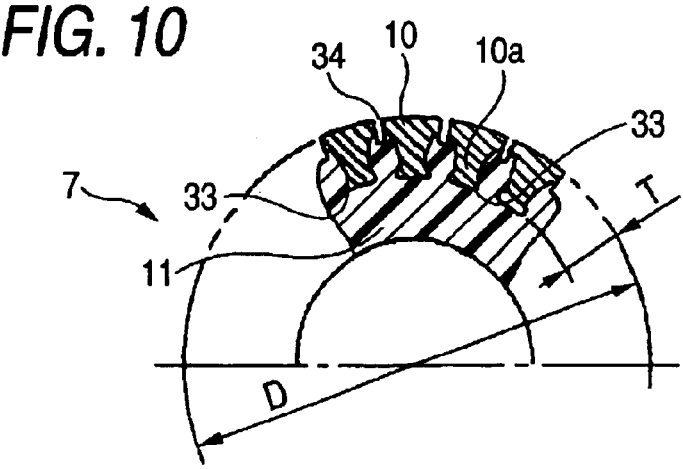
FIG. 10 is a pertinent sectional view of a sliding contact portion, which is taken along perpendicularly to an axial direction, showing an embodiment 4 of the present invention.

FIG. 10 is a pertinent sectional view of the sliding contact portion of the brush, which is taken along perpendicularly to an axial direction, like FIG. 4. Each commutator segment 10 having the almost drum shape has one leg portion 10a that extends toward the inner peripheral surface side. The convex portions 33 each having the pigeon tail shape to prevent the fling-out of the commutator segment 10 are provided to one end of the leg portion 10a. The leg portion 10a spreads over the almost all area in the axial direction. The convex portions 33 prevent the motion of the commutator segment 10 by the centrifugal force, etc. The commutator segment 10 is constructed in such a manner that 22 annular connected segments are formed from the pipe copper material by the press working, then the segments are molded integrally with the resin 11, and then adjacent commutator segments are separated electrically by the undercuts 34 respectively after the molding. When the commutator 7 to which the sliding contact portion of the brush contacts is sectioned perpendicularly to the axial direction, the thickness T of the commutator segments in the radial direction is 3.5 mm, and the diameter D of the outer peripheral surface of the commutator segments is 28 mm. Thus, a ratio T/D is set to 0.12. In this case, T/D of the similar commutator segment in the prior art is below 0.09, and the thickness of the commutator segment in the radial direction is about 1.4 times the conventional thickness on the inner peripheral side. In this case, this T/D is called a thickness factor in the following. Here, the rated current of this brush motor 1 for the electric power steering system is 80 A.

Figure 11:
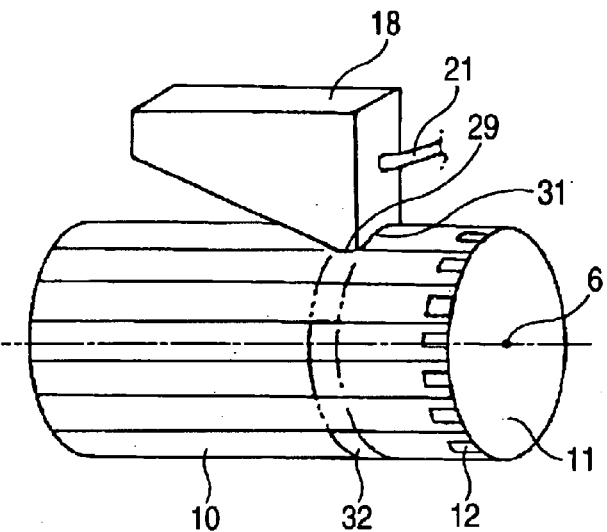
FIG. 11 is an explanatory view of a shape of a brush showing the embodiment 4 of the present invention.

FIG. 11 is an explanatory view showing a shape of a brush. The sliding surface 31 of the brush 18 on the hook side end portion 29 in the axial direction has the almost same curvature of the diameter as the outer peripheral surfaces of the commutator segments 10. The sliding surface 31 contacts sildably to the outer peripheral surfaces of the commutator segments 10 to form one sliding trace 32. In this case, a dimension of the brush 18 in the axial direction is about 15 mm, and the brush 18 has the sliding surface 31 of about 4 mm on the hook side end portion 29. Remaining portions except the above are constructed similarly to the embodiment 1.

Figure 12:
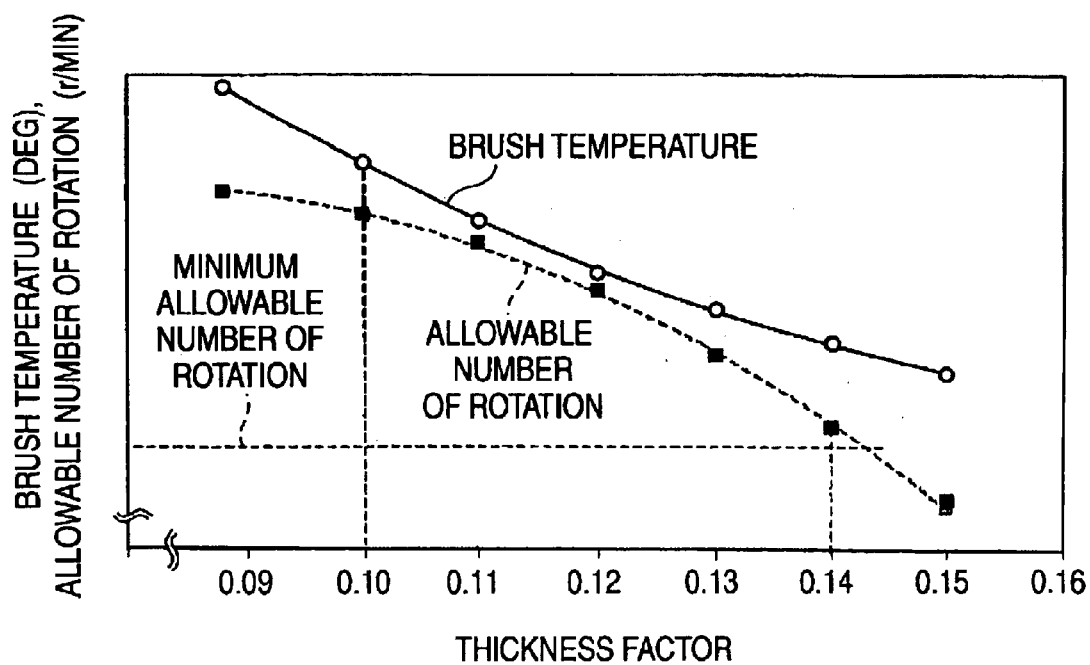
FIG. 12 is an explanatory view showing measured results of a thickness factor, a brush temperature, and an allowable number of rotation showing the embodiment 4 of the present invention.

FIG. 12 is an explanatory view showing measured results of the thickness factor, the brush temperature, and the allowable number of rotation. The measurement of the brush temperature and the allowable number of rotation was executed similarly to the above, and the minimum allowable number of rotation is also similar. As shown in FIG. 12, if the thickness factor is increased, the brush temperature is reduced and also the allowable number of rotation is lowered. The thickness factor is set below 0.09 such as 0.086, 0.089, or the like in the similar motor in the prior art. If the thickness factor is set to 0.10 or more but 0.14 or less, the brush temperature can be reduced while assuring the number of rotation in excess of the minimum allowable number of rotation. More preferably, if the thickness factor is set to 0.12 or more, such effect can be increased. The increase of the thickness factor leads to not only the reduction in rotational strength of the commutator segments 10 but also the increase in cost due to the increase of an employed amount of the copper material and the reduction in workability of the commutator segments 10. Therefore, such increase of the thickness factor was not considered unnecessarily in the prior art. As a result, such a technical concept was not found that the heat generated in the brush portion of the brush motor 1 for the electric power steering system is thermally transferred to the armature side by increasing the thickness factor to lower the brush temperature.

A sectional area of the commutator segment 10 is increased by setting the thickness factor to 0.21. Thus, even when not only the heat capacity is increased simply but also the great heat is generated in a short time, e.g., at the time of putting the car into the garage, the heat generated in the brush 18 can be thermally transferred effectively from the commutator segment 10 to the winding 9 and the equalizer 13 and also heat generation of the commutator segment 10 itself can be reduced, so that the temperature rise of the brush 18 can be suppressed. As a result, the reduction rate of the supplied current and a rated current can be increased, so that the steering feeling can be improved. Further, the minimum allowable number of rotation is satisfied and thus the safety brush motor 1 for the electric power steering system can be obtained. Further, since the sectional area is increased by reducing the inner diameter dimension of the commutator segment 10, the change in the basic configuration of the motor is not needed and thus the brush motor 1 for the electric power steering system that is small in size and has the small loss torque can be obtained.

Since the hook side end portion 29 of the brush 18 is shaped to contact slidably to the commutator segments 10, a surface pressure of the sliding surface 31 is increased and the contact of the brush 18 is stabilized. Thus, the heat generation can be reduced and the noise can be reduced. Further, since the hook side end portion 29 contacts slidably to the commutator segments 10, distances from the brush 18 to the winding 9 and the equalizer 13 become short, and thus the brush temperature can be lowered effectively. Such brush is suitable for the brush motor 1 for the electric power steering system in which the load applied to the springs 19 is small to reduce the loss torque.

Embodiment 5

Figure 13:
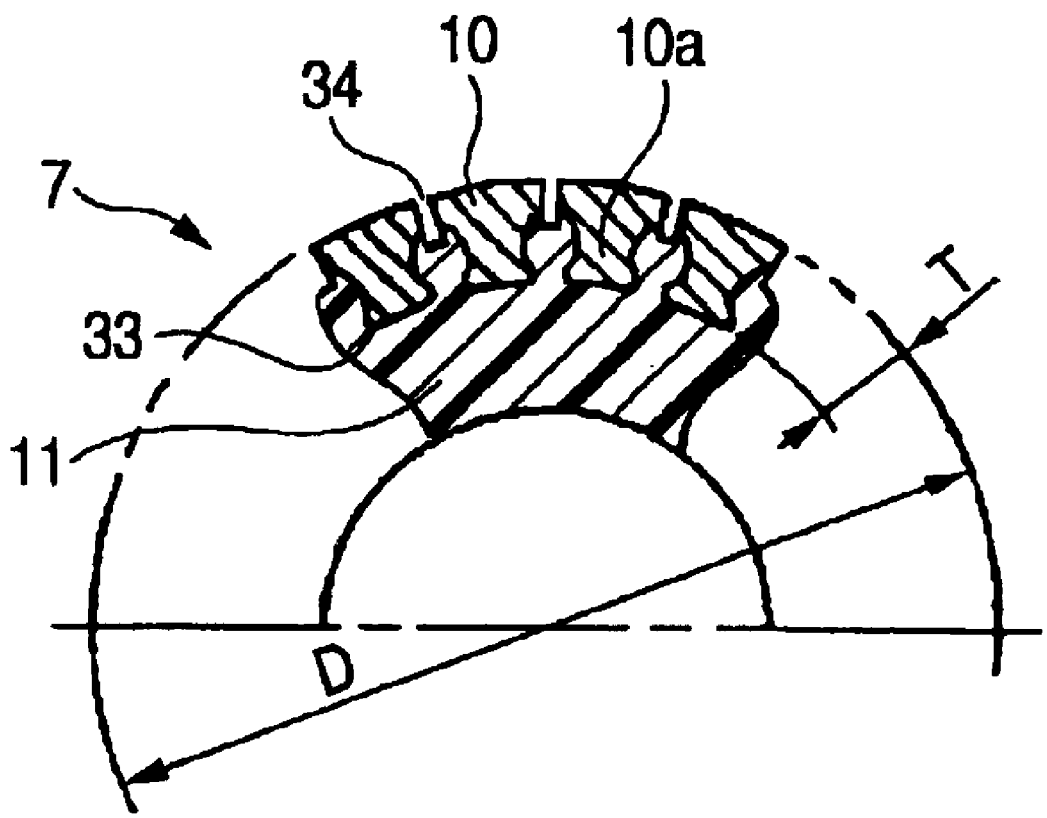
FIG. 13 is a pertinent sectional view of a sliding contact portion, which is taken along perpendicularly to an axial direction, showing an embodiment 5 of the present invention.

FIG. 13 is a pertinent sectional view of the sliding contact portion of the brush, which is taken along perpendicularly to the axial direction, like FIG. 10. The similar configuration to that in FIG. 10 is employed. When the commutator 7 to which the sliding contact portion of the brush contacts is sectioned perpendicularly to the axial direction, the thickness T of the commutator segments in the radial direction is 2.7 mm, and the diameter D of the outer peripheral surface of the commutator segments is 24.5 mm. Thus, the ratio T/D is set to 0.11.

The sectional area of the commutator segment 10 is increased toward the inner diameter side by setting the thickness factor to 0.11. Thus, the effect of reducing the brush temperature is reduced in contrast to the embodiment 4, but the considerable effect can be achieved. More preferably, the thickness factor should be set to 0.12 or more. Further, since the diameter D of the outer peripheral surface of the commutator segments 10 is reduced, the loss torque can be reduced. Therefore, this brush motor can also be installed into the vehicle whose engine capacity is relatively small.

As described above, according to the present invention, there is provided a brush motor for an electric power steering system comprising a four-pole field portion fixed to an inner wall surface of a yoke; an armature having windings which are wound around a core with 22 slots to constitute a lap winding, hooks which are formed on one ends of 22 commutator segments respectively and on which the windings are hooked, and a cylindrical commutator which is constructed by molding integrally the commutator segments with a resin, whereby convex portions for preventing fling-out of the commutator segment are provided on an inner peripheral surface side of each commutator segment to extend over an almost full length in an axial direction; and four brushes which contact slidably to outer peripheral surfaces of the commutator segments; wherein, when the commutator to which a sliding contact portion of the brush contacts is sectioned perpendicularly to an axial direction, a following relationship is satisfied.

$$0.18 \leq (A \times N)/(D \times D) \leq 0.23$$

where A is a sectional area (mm$^2$) of one commutator segment, N is a number of the commutator segments, and D is a diameter (mm) of outer peripheral surfaces of the commutator segments. Therefore, the heat generated in the brush portion can be thermally transferred effectively to the armature side, and thus the temperature rise of the brush can be suppressed. As a result, the brush motor 1 for the electric power steering system that has the small number of parts and has the good steering feeling can be obtained.

Further, there is provided a brush motor for an electric power steering system comprising a four-pole field portion fixed to an inner wall surface of a yoke; an armature having windings which are wound around a core with 22 slots to constitute a lap winding, hooks which are formed on one ends of 22 commutator segments respectively and on which the windings are hooked, and a cylindrical commutator which is constructed by molding integrally the commutator segments with a resin, whereby one leg portion is provided on an inner peripheral surface side of each commutator segment to extend over an almost full length in an axial direction and convex portions for preventing fling-out of the commutator segment are provided to one end of the leg portion; and four brushes which contact slidably to outer peripheral surfaces of the commutator segments; wherein, when the commutator to which a sliding contact portion of the brush contacts is sectioned perpendicularly to an axial direction, a following relationship is satisfied.

$$0.10 \leq T/D \leq 0.14$$

where T is a thickness (mm) of the commutator segment in a radial direction, and D is a diameter (mm) of outer peripheral surfaces of the commutator segments. Therefore, the heat generated in the brush portion can be thermally transferred effectively to the armature side, and thus the temperature rise of the brush can be suppressed. As a result, the brush motor 1 for the electric power steering system that has the small number of parts and has the good steering feeling can be obtained.

What is claimed is:

1. A brush motor for an electric power steering system comprising:
a four-pole field portion fixed to an inner wall surface of a yoke;
an armature including;
windings wound around a core with 22 slots to constitute a lap winding,
hooks which are formed on one ends of 22 commutator segments respectively and on which the windings are hooked, and
a cylindrical commutator which is constructed by molding integrally the commutator segments with a resin so that convex portions for preventing fling-out of the commutator segment are provided on an inner peripheral surface side of each commutator segment to extend over an almost full length in an axial direction; and
four brushes which contact slidably to outer peripheral surfaces of the commutator segments; wherein
when the commutator to which a sliding contact portion of the brush contacts is sectioned perpendicularly to an axial direction,
a relationship of $0.18 \leq (A \times N)/(D \times D) \leq 0.23$ is satisfied,
where A is a sectional area (mm$^2$) of one commutator segment, N is a number of the commutator segments, and D is a diameter (mm) of outer peripheral surfaces of the commutator segments.

2. A brush motor for an-electric power steering system comprising:
a four-pole field portion fixed to an inner wall surface of a yoke;
an armature including;
windings wound around a core with 22 slots to constitute a lap winding,
hooks which are formed on one ends of 22 commutator segments respectively and on which the windings are hooked, and a cylindrical commutator which is constructed by molding integrally the commutator segments with a resin, so that one leg portion is provided on an inner peripheral surface side of each commutator segment to extend over an almost full length in an axial direction and convex portions for preventing fling-out of the commutator segment are provided to one end of the leg portion; and four brushes which contact slidably to outer peripheral surfaces of the commutator segments; wherein when the commutator to which a sliding contact portion of the brush contacts is sectioned perpendicularly to an axial direction, a relationship of $0.10 \leq T/D \leq 0.14$ is satisfied, where T is a thickness (mm) of the commutator segment in a radial direction, and D is a diameter (mm) of outer peripheral surfaces of the commutator segments.

3. The brush motor for an electric power steering system according to claim 1, wherein at least two windings of the armature are hooked on each of the hooks.

4. The brush motor for an electric power steering system according to claim 1, wherein an equalizer is hooked on each of the hooks.

5. The brush motor for an electric power steering system, according to claim 1, further comprising:

a brush holder for holding the brush and having a parts, which is made of resin, in neighborhood of at least the brush.

6. The brush motor for an electric power steering system, according to claim 1, wherein a part of the brush in the axial direction contacts slidably to the commutator segments.

7. The brush motor for an electric power steering system, according to claim 1, wherein the brush has a shape that contacts slidably to more than three commutator segments that are formed adjacently in a circumferential direction.

8. The brush motor for an electric power steering system, according to claim 1 wherein a diameter of the outer peripheral surfaces of the commutator segments is 20 mm to 50 mm.

9. The brush motor for an electric power steering system according to claim 2, wherein at least two windings of the armature are hooked on each of the hooks.

10. The brush motor for an electric power steering system according to claim 2, wherein an equalizer is hooked on each of the hooks.

11. The brush motor for an electric power steering system, according to claim 2, further comprising:

a brush holder for holding the brush and having a parts, which is made of resin, in neighborhood of at least the brush.

12. The brush motor for an electric power steering system, according to claim 2, wherein a part of the brush in the axial direction contacts slidably to the commutator segments.

13. The brush motor for an electric power steering system, according to claim 2, wherein the brush has a shape that contacts slidably to more than three commutator segments that are formed adjacently in a circumferential direction.

14. The brush motor for an electric power steering system, according to claim 2, wherein a diameter of the outer peripheral surfaces of the commutator segments is 20 mm to 50 mm.

* * * * *